United States Patent Office 3,087,885
Patented Apr. 30, 1963

3,087,885
DEVICES FOR COOLING THE CONTROL RODS OF NUCLEAR REACTORS
André Ertaud, Paris, and Jacques Panossian, Chaville, France, assignors to Commissariat a l'Energie Atomique, Paris, France
Filed July 17, 1959, Ser. No. 827,956
Claims priority, application France July 22, 1958
3 Claims. (Cl. 204—193.2)

It is known that nuclear reactors generally include control rods containing a material capable of absorbing neutrons and the function of which is to modify the neutron flux when they are displaced, so as to permit of piloting the operation of the reactor. These rods are generally in the form of cylindrical elements, containing boron carbide for instance, and they are movable in channels provided in the core of the reactor.

Every element of the volume of a control rod absorbs a number of neutrons which depends upon the position of this element, that is to say on the one hand upon the position of the corresponding channel in the reactor, and on the other hand upon the position (generally the height) of this element in the rod. In other words, the number of neutrons that is absorbed depends upon the geometry of the reactor.

Now, it is known that the absorption of neutrons by a body causes a disengagement of heat proportional to the intensity of this absorption. In order to maintain the temperature of this absorbing body within admissible limits, for instance at 450° C. in the case of a metallic uranium reactor, it is necessary to cool said body. This cooling is generally obtained by means of a fluid circulation. The flow rate of this fluid depends of course upon the amount of heat to be absorbed. In order to keep the temperature within the desired limits, it is therefore necessary to regulate this flow rate as a function of the position of the rods in the reactor.

The object of the present invention is to provide a coolant fluid circulation device capable of preventing the temperature from exceeding a maximum admissible value while avoiding losses of this fluid.

The cooling device according to the present invention is characterized in that the rods cooperate with channels of a section which increases toward the core portion of the reactor, so as thus to provide, for the flow of the coolant fluid, a passage of a section which is the larger as the rod is more deeply engaged into said channel. Advantageously, the means forming every channel intended to receive a control rod include a plurality of tubes the diameters of which increase from the inlet end of the channel toward the outlet thereof, said tubes being joined end to end to one another.

A preferred embodiment of the present invention will be hereinafter described with reference to the accompanying drawings, given merely by way of example and in which.

Figure 1:
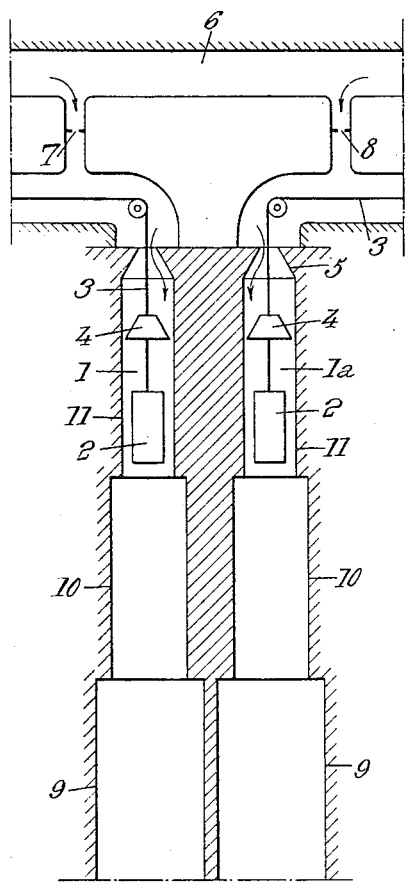
FIG. 1 is a diagrammatic vertical section of a portion of a control rod cooling device according to the invention.

FIG. 1 shows two vertical channels 1 and 1a containing control rods 2, said control rods being displaceable by means of a winch, not shown on the drawing, which is located in the medium constituted by the coolant fluid, this winch being adapted to modify the position of the rods which are connected thereto by means of cables such as 3. Above the upper end of every rod 2, the corresponding cable 3 carries a frusto-conical plug member 4.

Channels 1 and 1a are provided at their upper ends, which constitute their inlet ends for the feed of coolant fluid thereto, with frusto-conical throttled portions 5 of a shape corresponding to that of the frusto-conical plugs 4. The coolant fluid is fed in parallel to channels 1 and 1a from a distributing conduit 6. Conduit 6 is connected to channels 1 and 1a through orifices 7 and 8 the cross-sectional area of which is determined as a function of the position of the corresponding channels 1 and 1a in the nuclear reactor.

It will be seen that channels 1 and 1a are advantageously constituted by a lower cylindrical portion 9 above which are provided a plurality of tubes, such as 10 and 11, having respective diameters which increase from the top toward the bottom. The upper tubular element 11 includes the above mentioned conical portion 5.

Figure 2:
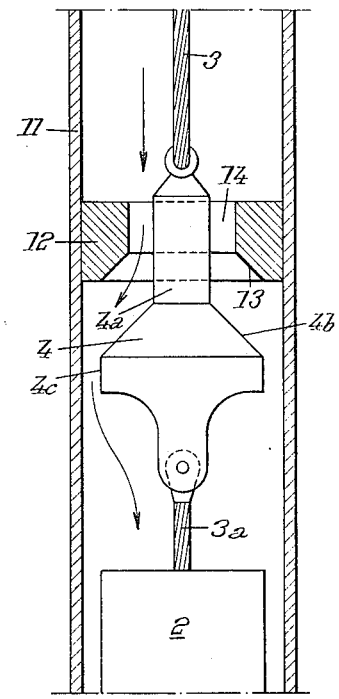
FIG. 2 is an axial section of a valve used for controlling the flow of fluid through a control rod channel.

Adjustment of the flow rate of fluid through each channel 1 or 1a may be, according to the invention, ensured by an arrangement such as shown by FIG. 2 where a portion of tube 11 is visible. In this tube is fixed a ring 12 provided with a central hole including a frusto-conical portion 13 and a cylindrical portion 14. At the lower end of cable 3 is fixed a closing plug 4. This plug 4, made of steel, includes an upper cylindrical portion 4a, a frusto-conical body 4b and a cylindrical lower portion 4c of a diameter equal to the diameter of the bottom of body 4b. Control rod 2 is connected to cylindrical portion 4c through cable 3a.

In the case of the French reactor called "G2," the control rods, such as 2, are cylindrical elements having a diameter of about 4 cm. and a length of 500 cm. The coolant fluid is carbonic anhydride under a pressure of 15 kg./sq. cm. and it is necessary to provide flow rates, indicated in weights per second, through the channels of the control rods, which vary from 370 grams per second for the most central channel to 120 grams per second for the most peripheral channels. On the other hand, for the central channel, the necessary flow rate ranges from 370 grams per second when the rod is in its lowest position (maximum absorption of neutrons) to 6 grams per second for the normal upper position thereof (minimum absorption of neutrons).

The circulation of carbonic anhydride is ensured by a difference of pressure between the upstream and downstream sides, respectively, of channels 1, averaging 100 grams per sq. cm. for the full power of the reactor. The 51 channels of the control rods of the reactor may be distributed into three groups so that the number of types of the holes such as 7 and 8 is three. The diameters of said holes have been calculated and are as follows:

4 cm. for the channels of the central rods,
3 cm. for the channels of the intermediate rods,
2 cm. for the channels of the peripheral rods.

In these conditions, for a flow rate of 370 grams per second in the central channel, the flow rate through each of the peripheral channels is 140 grams per second. As for the variation of flow rate in a channel 1 as a function of the position of rod 2 in said channel, it is achieved by the device according to the invention which produces a great increase of the pressure drop when the rod is lifted in each channel in the following manner:

After it has been extracted upwardly from channel 9 (FIG. 1), which is formed in the moderator graphite block, the rod penetrates successively into tubes 10 and 11 the inner diameters of which are, respectively, 62 mm. and 54 mm. The cross-sectional area for the stream of coolant fluid therefore decreases when the rod is moved in the upward direction. The frusto-conical throttled portion 5 provided at the upper end of tube 11 has a minimum diameter of 24 mm. and its height is 60 mm. This throttled portion 5 and plug 4 cooperate together to perform a double function:

When plug 4 is engaged in throttled portion 5, without wholly closing it, the circulation of carbonic anhydride is very much reduced without being wholly stopped. This corresponds to the normal top position of the control rod for which a very low flow rate of the coolant fluid is necessary;

On the contrary, when plug 4 is applied against the valve seat formed by throttled portion 5, the coolant fluid circuit upstream of throttled portion 5 is cut off from the inside of the reactor. This makes it possible to restore atmospheric pressure in the chamber containing the winch that operates the control rods, so that it is possible to have access to this winch for the upkeep thereof.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. In a nuclear reactor, a core, tubular means forming a plurality of channels extending through said core and each having an inlet end and an outlet end, means for feeding a coolant fluid under pressure at the inlet end of each of said channels, each of said channels being of increasing cross section from said inlet end toward the outlet end thereof, a neutron abosrbing control rod of uniform cross section in each of said channels coaxially displaceable therein, said rod being so dimensioned that when it is engaged to the minimum depth in the respective channel, the end of said rod nearest to the channel inlet end is in the portion of minimum cross section of the channel, whereas when said rod is engaged to the maximum depth in the respective channel so as to be located in said core, said rod end nearest to the channel inlet end is in the portion of maximum cross section of said channel and means for adjustably positioning each of said control rods in its respective channel, whereby the coolant flow rate along each of said rods increases when said rod is introduced more deeply into said core.

2. A combination according to claim 1 wherein each channel includes a plurlity of tubes disposed end to end and the respective diameters of said tubes increase from the inlet end of said channel toward the outlet end thereof.

3. A combination according to claim 1 further comprising in each of said channels a valve member mounted in fixed relation to the rod in said channel between said rod and the inlet end of said channel, said channel inlet end forming a valve seat adapted to cooperate with said valve member, whereby the inflow of coolant fluid to said channel can be stopped when said rod is retracted from said core.

References Cited in the file of this patent

UNITED STATES PATENTS

| | | |
|---|---|---|
| 2,919,236 | Zinn | Dec. 29, 1959 |
| 2,937,127 | Flora | May 17, 1960 |

FOREIGN PATENTS

| | | |
|---|---|---|
| 1,027,338 | Germany | Apr. 3, 1958 |